United States Patent [19]
Snaith et al.

[11] Patent Number: 5,149,066
[45] Date of Patent: Sep. 22, 1992

[54] ISOLATOR WITH IMPROVED SYMMETRICAL RESPONSE TO SHOCK AND VIBRATION FORCES

[75] Inventors: Raymond E. Snaith, Jericho; Max Barrasso, Merrick; Eric Jansson, Huntington, all of N.Y.

[73] Assignee: Aeroflex International Incorporated, Caguas, P.R.

[21] Appl. No.: 653,257

[22] Filed: Feb. 11, 1991

[51] Int. Cl.$^5$ .................. F16F 1/00; F16M 1/00
[52] U.S. Cl. .................. 267/136; 267/147; 267/160; 248/636
[58] Field of Search .............. 267/136, 146, 147, 160; 248/636, 603, 618, 562

[56] References Cited

U.S. PATENT DOCUMENTS 2,594,665  4/1952  Lockwood .............. 267/160 X
4,744,547  5/1988  Härtel .............. 248/636 X

FOREIGN PATENT DOCUMENTS 112111   9/1928  Austria .............. 267/146
547783   4/1932  Fed. Rep. of Germany .... 267/160
1461106 10/1966  France .............. 248/636
1017857  5/1983  U.S.S.R. .............. 248/603

Primary Examiner—Joseph F. Peters, Jr.
Assistant Examiner—Carla Mattix
Attorney, Agent, or Firm—Rosenman & Colin

[57] ABSTRACT

An isolator with improved uniform spring characteristic response resists transmission of shock and vibration forces between structures, and includes a plurality of arched, individual, flexural support elements arranged circumferentially about an upright axis and spanning the distance between a base connectable to one of the structures, and an elevated support connectable to another of the structures.

11 Claims, 1 Drawing Sheet

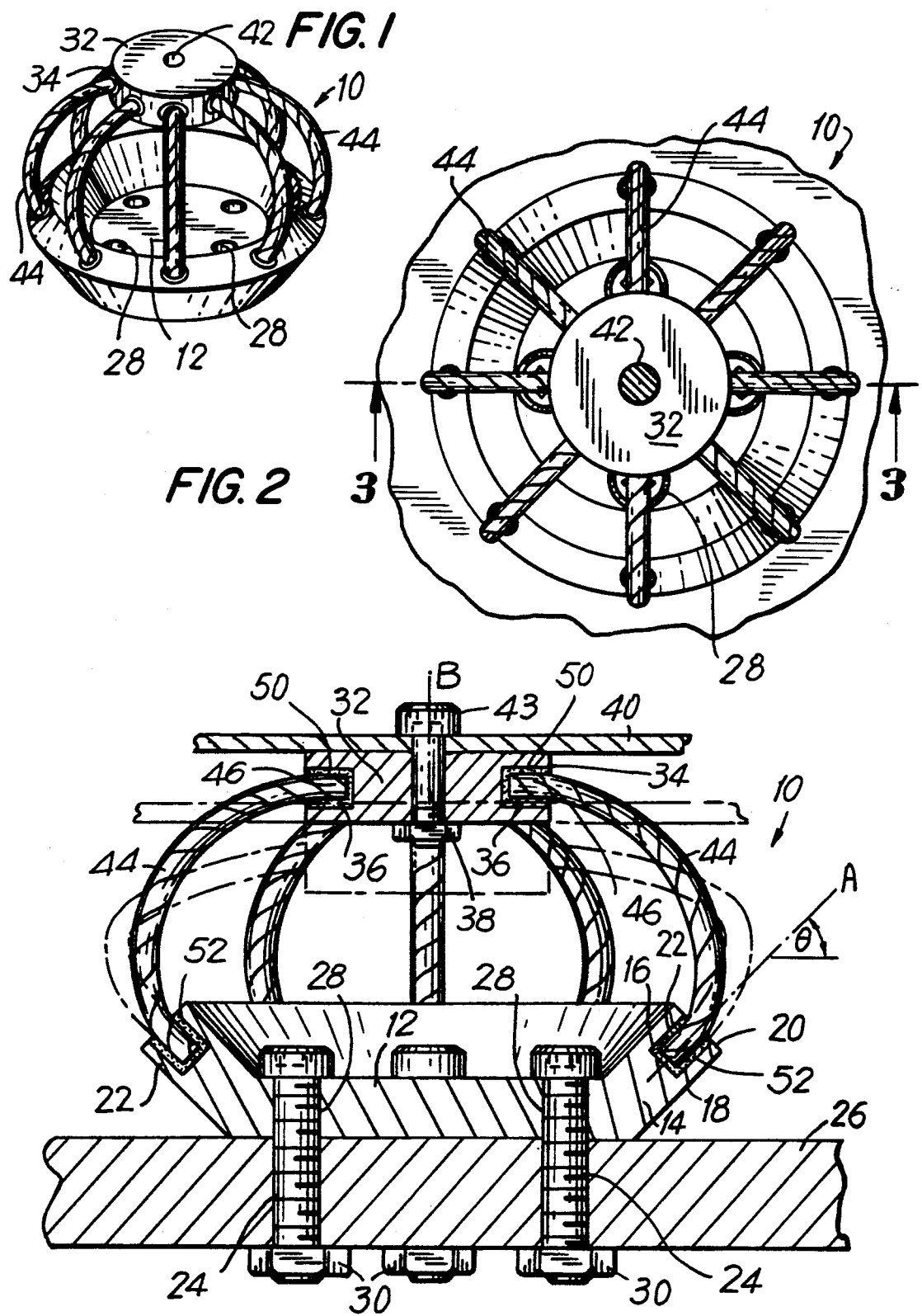

ISOLATOR WITH IMPROVED SYMMETRICAL RESPONSE TO SHOCK AND VIBRATION FORCES

BACKGROUND OF THE INVENTION

1. Field of the Invention

This invention generally relates to an isolator for resisting transmission of shock and vibration forces between structures and, more particularly, to an isolator having an improved symmetrical response to shock and vibration forces exerted on the isolator from different directions.

2. Description of Related Art

Isolators for protecting a mounted item or load structure, such as an equipment cabinet, from shock or vibration forces exerted by another structure, such as a moving vehicle, are well known and have been used in many industrial and military applications. U.S. Pat. Nos. 4,190,227 and 4,783,038 are exemplificative of elongated bar-shaped isolators having arched flexural elements that together provide a first spring characteristic response to shock and vibration forces along a longitudinal direction of a respective isolator, and a second, different spring characteristic response to such forces directed along a transverse direction generally perpendicular to the longitudinal direction. U.S. Pat. No. 4,269,400 is an example of a one-piece, molded, elastomer or plastic isolator composed of multiple nested sections, the number of such sections being selected to achieve a desired spring characteristic response. European patent application No. 83108900.8 (Publication No. 0 124 640) discloses an isolator employing spirally wound and/or semi-circularly wound wire cables.

SUMMARY OF THE INVENTION

1. Objects of the Invention

It is a general object of this invention to advance the state of the art of force-damping isolators.

It is another object of this invention to provide a more uniform spring characteristic for an isolator.

Another object of this invention is to render the isolator more independent of the direction in which shock and vibration forces originate.

A further object of this invention is to provide improved lateral stability for an isolator.

Yet another object of this invention is to provide a durable isolator of rugged construction for effectively resisting transmission of shock and vibration forces between structures.

2. Features of the Invention

In keeping with these objects, and others which will become apparent hereinafter, one feature of this invention resides, briefly stated, in an isolator for resisting transmission of shock and vibration forces between structures such as a moving structure and a load structure to be mounted on the moving structure.

The isolator comprises a base connectable to one of the structures, and having an outer peripheral portion. The isolator also includes an elevated support connectable to another of the structures, and having an outer peripheral section. The elevated support is spaced at a distance from the base as considered along a predetermined axis.

A plurality of arched, individual, flexural support elements are arranged circumferentially about the predetermined axis and span the distance between the base and the elevated support. Each arched element has one end operatively connected to the outer peripheral section of the elevated support, and an opposite end operatively connected to the outer peripheral portion of the base. The arched elements are tensioned, and flex from a rest position in response to the transmission of shock and vibration forces between the structures, and return to the rest position when said forces have abated.

In the preferred embodiment, the base has a dish-shaped configuration, and has a generally planar base portion and an annular side portion extending along an inclined axis away from the base portion. The elevated support has a circular configuration, and is concentric with the base with respect to the predetermined axis. The arched elements are equi-angularly arranged about the predetermined axis.

Due to the symmetrical arrangement of the arched elements, as well as the symmetrical configurations of the support and the base, the spring response characteristic of the isolator will be nearly uniform, no matter from which direction the shock and vibration forces emanate.

In addition, the annular side portion is provided with an outer annular end wall that extends generally normally to the inclined axis. Each said opposite end of the arched elements passes through the end wall into the annular side portion. The mounting of the arched elements on the inclined side wall, which is preferably oriented at an angle about 45° to the horizontal, provides an increased lateral stability from shock and vibration forces emanating from the various sides of the isolator.

The ends of each arched element are securely connected, e.g. by an adhesive or by staking, to the outer peripheries of the support and the base. Other means of anchoring the ends of the arched elements in place are also envisioned.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front, side and top, perspective view of an isolator according to this invention;

FIG. 2 is an enlarged, top plan view of FIG. 1; and

FIG. 3 is a sectional view taken on line 3—3 of FIG. 1, showing the isolator mounted between structures.

DETAILED DESCRIPTION OF THE PREFERRED EMBODIMENTS

Referring now to the drawings, reference numeral 10 generally identifies an isolator having an improved, symmetrical spring characteristic response to shock and vibration forces according to this invention. Isolator 10 includes a generally dish-shaped base having a generally planar circular base portion 12, and an annular side portion 14 extending along an inclined axis A (see FIG. 3) at any acute angle $\theta$ from zero to 90°, preferably 45° relative to the horizontal, i.e. the plane in which the base portion 12 lies. The inclined side wall 14 has an inner annular surface 16 and an outer annular surface 18 extending in mutual parallelism along the inclined axis. An annular peripheral end wall 20 extends between the inner and outer surfaces 16, 18 in a direction generally normal to the inclined axis. A plurality of blind bores 22 are equi-angularly arranged about a central vertical axis B perpendicular to the base portion 12. Each bore 22 extends from the end wall 20 into the side wall 14 for a limited distance.

The dish-shaped base is secured, e.g. by threaded fasteners 24, to a structure 26, e.g. a moving vehicle subject to vibration and shock forces. Holes 28 extend through the base portion 12 to permit the fasteners 24 to extend therethrough and to threadedly engage nuts 30. Other types of fasteners are within the spirit of this invention.

Isolator 10 further includes a circular elevated support 32 having an outer peripheral end wall 34. The support 32 lies in a plane generally parallel to, and concentric with, the base portion 12 as considered along central axis B. The support 32 is spaced at a constant distance from the base portion 12 in the rest position shown in solid lines in FIG. 3. A plurality of blind bores 36 are equi-angularly arranged about central axis B generally normal to the support 32. Each bore 36 extends from the end wall 34 into the support 32 for a limited distance.

The support 32 is secured, e.g. by fastener 38, to a load structure 40, e.g. an item or equipment cabinet, to be protected from the vibration and shock forces generated by the movable structure 26. A hole 42 extends through the support 32 to permit the fastener 38 to extend therethrough and to threadedly engage a nut 43. Other types of fasteners are within the spirit of this invention. The structures 26, 40 may be reversed from their positions illustrated in FIG. 3.

A plurality of arched, individual, flexural support elements 44 are arranged circumferentially and symmetrically about the central axis B. Each arched element 44 spans the distance between the base and the elevated support. Each arched element 44 has one end 46 operatively connected to the support 32. For example, each end 46 is inserted fully into the bore 36 and adhesively secured in place therein by an epoxy 50. Each arched element 44 has an opposite end 48 operatively connected to the base. For example, each end 48 is inserted fully into a respective bore 22 and secured therein, either by an epoxy as previously described, or by some other means, for example, by a staking process wherein the inner and outer surfaces 16, 18 of the inclined side portion 14 are pinched together under pressure and deformed to form barbs 52 which bitingly engage the respective end 48 of a respective arched element 44. Both ends 46, 48 of each arched element can be adhered or staked in place, or anchored in their respective bores by other types of secure connections.

Each arched element 44 is a tensioned spring, preferably constituted of at least one steel wire, and preferably a plurality of steel wires wound to form a stranded rope. Each arched element 44 flexes from the rest position shown in solid lines in FIG. 3, to a multitude of flexed positions, one of which is shown in dashed lines in FIG. 3, in response to the transmission of shock and vibration forces between the structures 26, 40. The elements 44 return the isolator to the rest position when such forces have abated. Although the isolator has been illustrated as having eight arched elements, more or fewer elements are comprehended within the scope of this invention.

The symmetrical arrangement of the arched elements which can be said to resemble a spider-like configuration, as well as the symmetrical configurations of the support and the base, render the spring response characteristic of the isolator more uniform, no matter from which transverse direction the shock and vibration forces originate. Also, the mounting of the arched elements on the inclined side portion 14 of the base provides an increased lateral stability from transversely-directed shock and vibration forces. Lateral stability is enhanced by the dish-shaped configuration of the base, particularly by the inclined end wall 20 which circumferentially surrounds the central axis at a greater radial distance than the end wall 34.

It will be understood that each of the elements described above, or two or more together, also may find a useful application in other types of constructions differing from the types described above.

While the invention has been illustrated and described as embodied in an isolator with improved symmetrical response to shock and vibration forces, it is not intended to be limited to the details shown, since various modifications and structural changes may be made without departing in any way from the spirit of the present invention.

Without further analyais, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An isolator for resisting transmission of shock and vibration forces between structures, comprising:
   (a) a dish-shaped base connectable to one of the structures, and having an outer peripheral portion;
   (b) an elevated support connectable to another of the structures, and having an outer peripheral section, said elevated support being spaced at a distance from the base as considered along a predetermined axis; and
   (c) a plurality of arched, individual, flexural support, wire elements arranged circumferentially about the predetermined axis and spanning the distance between the base and the elevated support, each arched wire element having one end connected interiorly within the elevated support and extending past the outer peripheral section of the elevated support and an opposite end connected interiorly within the base and extending past the outer peripheral portion of the base, said arched wire elements being tensioned and flexing from a rest position in response to the transmission of shock and vibration forces between the structures, and returning to the rest position when said forces have abated.

2. The isolator as claimed in claim 1, wherein the base has a generally planar base portion, and wherein the elevated support has a generally planar configuration, and wherein the predetermined axis extends normally of the generally planar base portion and the generally planar elevated support, and wherein the arched elements are equi-angularly and symmetrically arranged about the predetermined axis.

3. The isolator as claimed in claim 1, wherein the base has a generally planar base portion and an annular side portion extending along an inclined axis at an acute angle relative to the base portion.

4. The isolator as claimed in claim 3, wherein the acute angle is in the range from 0° to 90°.

5. The isolator as claimed in claim 3, wherein the annular side portion has an outer annular end wall extending generally normally of the inclined axis, and wherein each said opposite wire end of the arched elements passes through the outer annular end wall into the annular side portion.

6. The isolator as claimed in claim 1, wherein the elevated support has a circular shape, and wherein the outer peripheral section has an outer annular wall, and wherein each said one wire end of the arched elements passes through the outer annular wall into the elevated support.

7. The isolator as claimed in claim 1, wherein each arched element is a strand of metal wires.

8. The isolator as claimed in claim 1, wherein the outer peripheral portion is circular and has a given diameter, and wherein the outer peripheral section is circular and has a diameter smaller than said given diameter.

9. The isolator as claimed in claim 1, wherein the ends of each arched wire element are adhesively secured within the base and the elevated support.

10. The isolator as claimed in claim 1, wherein the ends of each arched element are staked to the outer peripheral portion and the outer peripheral section.

11. An isolator for resisting transmission of shock and vibration forces between structures, comprising:
   (a) a dish-shaped, circular base connectable to one of the structures, and having a generally planar base portion and an annular side portion extending along an inclined axis away from the base portion;
   (b) a circular elevated support connectable to another of the structures, and having an outer annular wall, said elevated support being concentric with, and spaced at a distance from, the base as considered along a predetermined axis; and
   (c) a plurality of arched, individual, flexural support, metal wire elements arranged equi-angularly about the predetermined axis and spanning the distance between the base and the elevated support, each arched metal wire element having one end connected interiorly within the elevated support and extending past the outer annular wall of the elevated support and an opposite wire end connected interiorly within the base and extending past the annular side portion of the base, said arched metal wire elements being tensioned and flexing from a rest position in response to the transmission of shock and vibration forces between the structures, and returning to the rest position when said forces have abated.

* * * * *